B. H. HOWARD AND E. J. TURNER.
INGOT MOLD.
APPLICATION FILED JUNE 19, 1919.
1,335,685.
Patented Mar. 30, 1920.
4 SHEETS—SHEET 1.
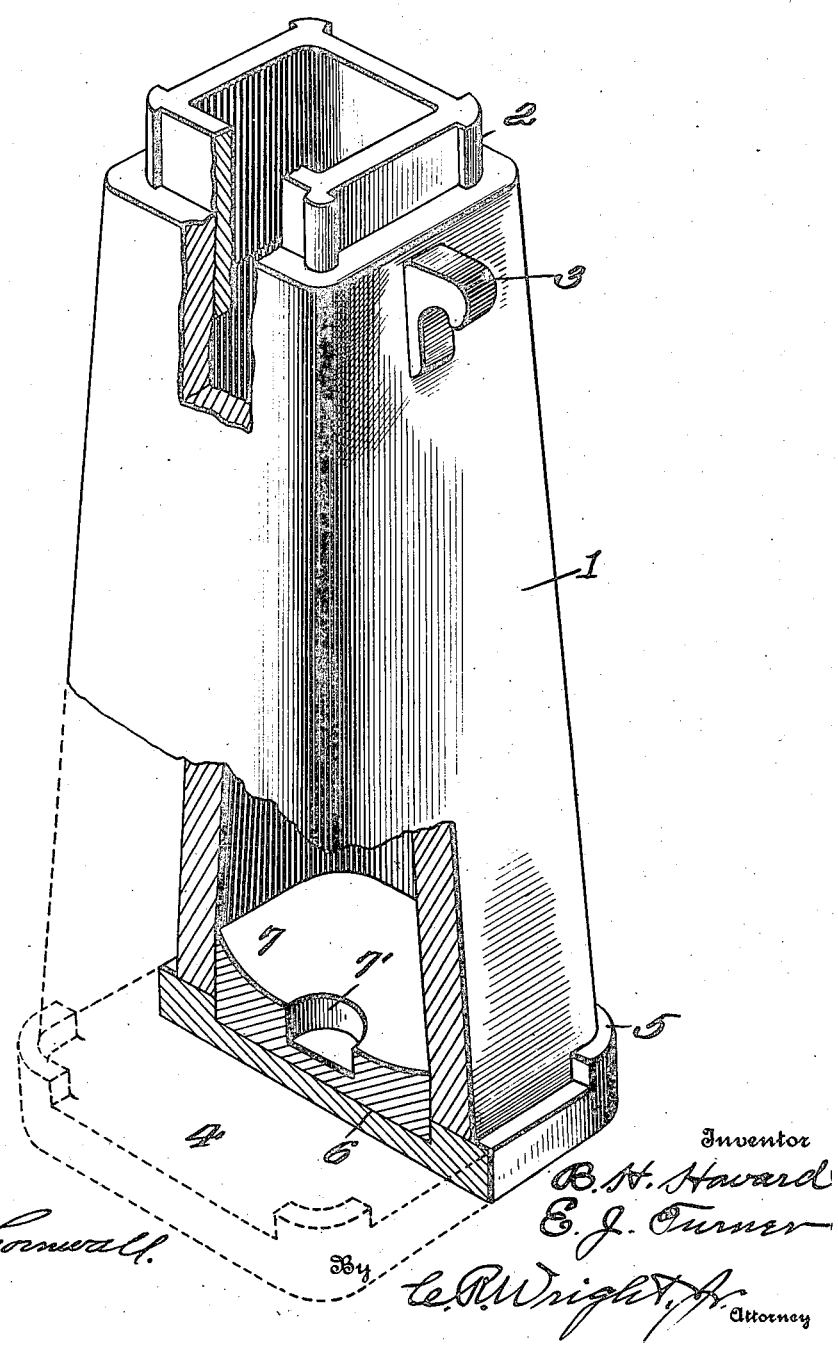

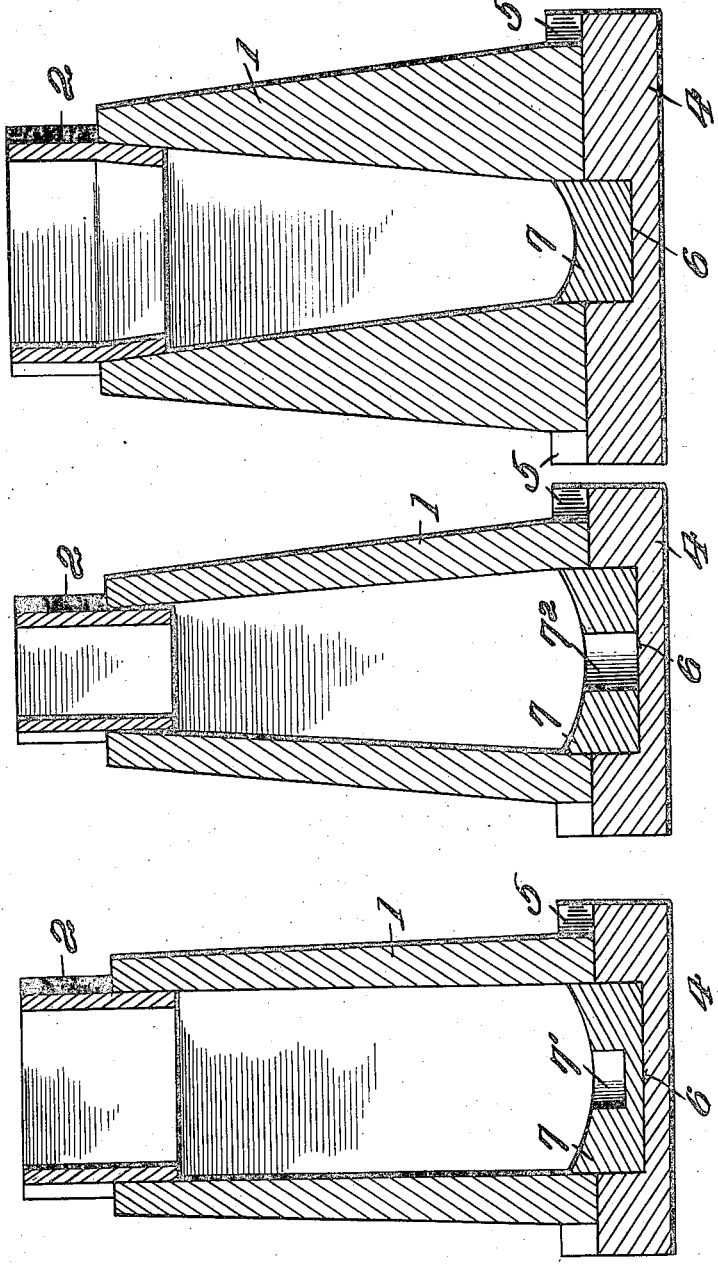

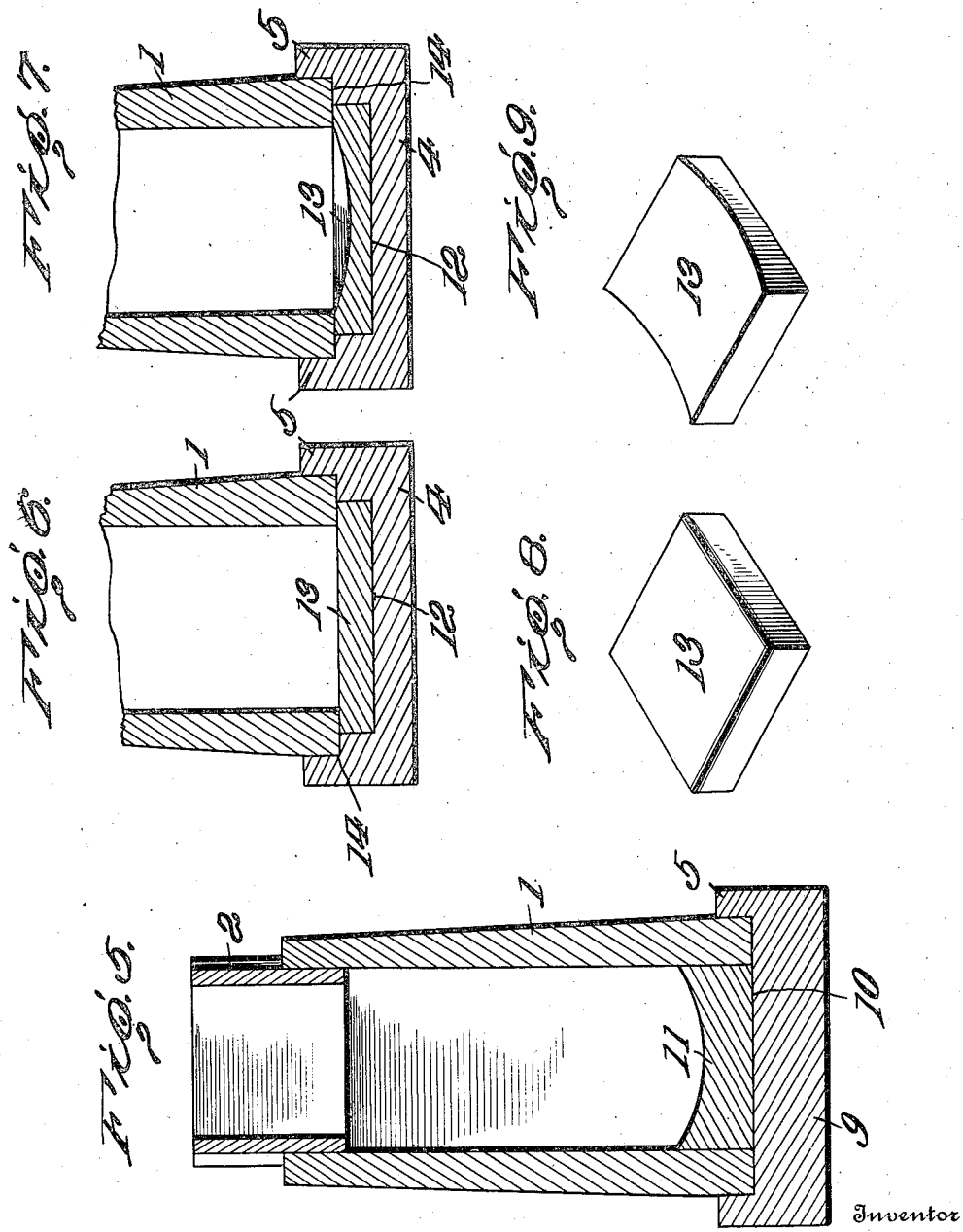

B. H. HOWARD AND E. J. TURNER.
INGOT MOLD.
APPLICATION FILED JUNE 19, 1919.

1,335,685.

Patented Mar. 30, 1920.
4 SHEETS—SHEET 4.

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

INGOT-MOLD.

1,335,685.  Specification of Letters Patent.  Patented Mar. 30, 1920.

Application filed June 19, 1919. Serial No. 305,282.

*To all whom it may concern:*

Be it known that we, BLOOMFIELD H. HOWARD, of Washington, District of Columbia, and ERNEST J. TURNER, of Pittsburgh, in the county of Allegheny and State of Pennsylvania, citizens of the United States, have invented new and useful Improvements in Ingot-Molds, of which the following is a specification, reference being had therein to the accompanying drawings.

Our invention relates to improvements in molds and method of casting ingots.

The object of our invention is to provide an ingot mold in which the top and bottom are provided with means for retaining the heat from the ingot, thus preventing what is known as piping at the upper end of the ingot and preventing cracks and other imperfections at the lower end of the ingot, and whereby the even cooling of the entire ingot forms a more homogeneous mass throughout its length and makes a lighter grade steel in which there is practically no flaws, and, therefore, no loss in metal.

Another object of our invention is to provide a mold of this character and in which the heat retaining means may be readily placed in the bottom of the mold and removed for another operation, and which is simple in structure and operation and having certain details of structure and combination of parts hereinafter more fully described.

A further object of the invention is to provide a method and mold for casting ingots, in which the molten metal is prevented from splashing up on the sides of the mold and forming scale on the sides of the ingot.

In the accompanying drawings—

Figure 1 is a perspective view of our improved ingot mold, showing the upper and lower ends of the mold broken away to show the upper and lower heating means;

Fig. 2 is a vertical sectional view of a modified form of mold showing the walls vertical;

Fig. 3 is a transverse vertical sectional view of a modified form of mold showing the walls tapering toward the top;

Fig. 4 is a transverse vertical sectional view of a modified form of mold showing the walls tapering toward the bottom;

Fig. 5 is a transverse vertical sectional view of a modified form of heater at the lower end of the mold;

Fig. 6 is a transverse vertical sectional view of a still further modified form of bottom heater;

Fig. 7 is a still further modified form;

Fig. 8 is a perspective view of the form of ingot base shown in Fig. 6;

Fig. 9 is a perspective view of the form of ingot base shown in Figs. 1, 2, 3, 4 and 5;

Figure 10:
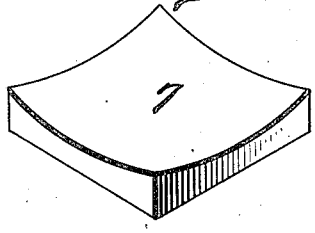
Figure 11:
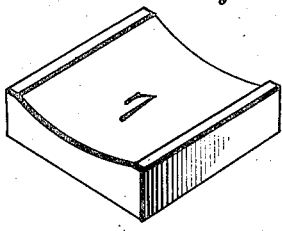
Figure 12:
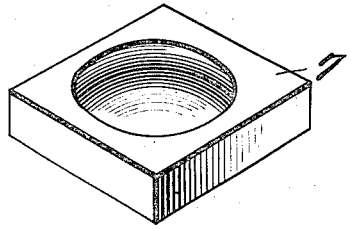
Figure 13:
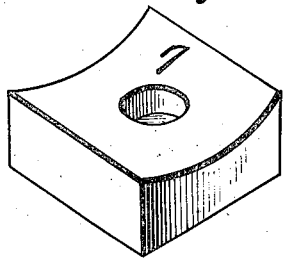
Figure 14:
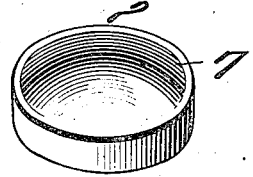
Figure 15:
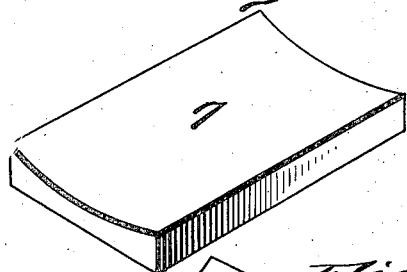
Figure 16:
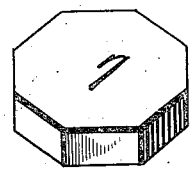
Figure 17:
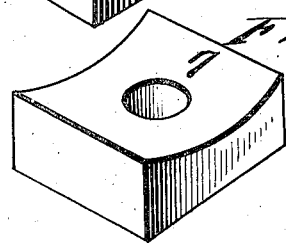
Figure 18:
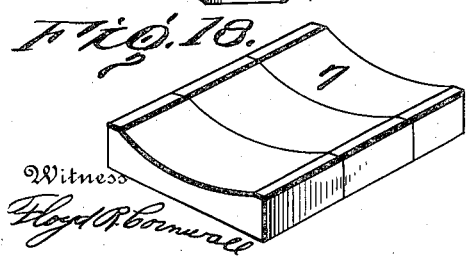
Figure 19:
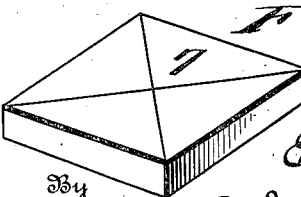

Figs. 10 to 19, inclusive, show a number of different forms in which the ingot base could be made to carry out our invention.

Referring now to the drawings, 1 represents the body of our improved ingot mold which, as shown in the preferred form in Fig. 1, tapers upwardly. Within the upper end of the mold is the feeder 2, which is made of refractory material for holding the heat and prevents the rapid cooling of the upper end of the mold and thus prevents what is known as piping in the ingot which is well understood by those skilled in the art. The outer face of the mold at its upper end is provided with the usual ears 3 for receiving hooks for lifting the mold and removing the ingot. The mold rests upon the stool 4, which is made of cast iron or steel and provided at its outer edge with an upwardly extending lug 5, adapted to engage the outer periphery of the mold and hold the same on the stool against lateral movement.

The stool 4 is provided with a recess 6, in its upper face, the cross area of which is equal to the inner diameter of the mold 1 and of a shape to correspond therewith. As shown in Fig. 1 of the drawings, the recess and the mold are rectangular in cross-section and fitting in the recess is the ingot base 7, which is made of refractory material to retain the heat and is of a thickness greater than the depth of the recess so that the said base extends up into the interior of the mold, as indicated at 8, and closely fits the inner walls thereof. It is essential that the base closely fit the recess and also the walls of the mold to prevent the molten metal from passing down around the base and floating the same. The upper face of the base, as shown in Fig. 3, of the drawings, is concaved in one direction and is formed, as shown in Fig. 9, of the drawings.

In Fig. 2 of the drawings, the same principle is employed, except the walls of the mold are parallel and in Fig. 4 of the drawings, the walls of the mold diverge toward the upper end.

In Fig. 5 of the drawings the stool 9 is not provided with a recess, the upper face 10 being preferably flat and the ingot base 11 rests thereon and is wholly within the mold, and like the form shown in Figs. 2, 3 and 4, it has its upper face concaved.

In Figs. 6 and 7, the stool is provided with a recess 12 which is slightly larger in diameter than the interior diameter of the mold and the ingot base 13 is of a thickness equal to the depth of the recess so that the upper faces of the ingot base and stool are flush and the lower end of the mold 14 covers the joint between the ingot base and the stool. The ingot base 13 in this form can have its upper face perfectly flat, as shown in Fig. 8, or can be concaved, as shown in Fig. 9.

The ingot base can be made in many forms and shapes to fit the required shape of the ingot molds, such as shown in Figs. 10 to 19, inclusive. Attention is particularly called to the form shown in Fig. 18, which shows the ingot base made in several sections so that the application and the removal of the same from the stool can be more readily accomplished.

The ingot base 7 may be provided with a recess 7', which is located in the center and, upon the pouring of the metal in the mold, the stream of molten metal enters the recess and splashes against the sides of the recess, but will not splash against the sides of the mold, and thus prevents scale on the outer face of the ingot, which usually occurs and is caused by the splashing of the molten metal against the sides of the mold. The small tit formed by the recess on the lower end of the ingot is broken off after the ingot has cooled.

In the form shown in Fig. 3, instead of having a recess, a hole $7^2$ may be made completely through the ingot base, which will accomplish the same result as the recess shown in Fig. 1 of the drawings.

In the claims we have used the word "opening" to designate either a cavity in the ingot base or an opening extending entirely therethrough.

Having thus described our invention, what we claim and desire to secure by Letters Patent is:—

1. The combination with an ingot mold, of a stool, and an ingot base made of refractory material carried by the stool and adapted to prevent the rapid cooling, the lower end of the ingot becoming more homogeneous in structure.

2. The combination with an ingot mold, of a stool, and an ingot base made of refractory material and resting upon the stool within the mold, said base having a concaved upper face and adapted to prevent the rapid cooling, of the lower end of the ingot, whereby the ingot becomes more homogeneous in structure.

3. The combination with an ingot mold, of a stool having a recess in its upper face and an ingot base formed so as to wedge tightly within the said recess and adapted to retain the heat of the ingot to prevent the rapid cooling of the lower end thereof and forming a more homogeneous mass throughout its length.

4. The combination with an ingot mold, of means in the bottom of the mold to prevent the molten metal from splashing on the sides of the mold during the pouring operation.

5. The combination with an ingot mold, of an ingot base closing the lower end of the mold, and means carried by the base to prevent the molten metal from splashing on the sides of the mold during the pouring operation.

6. An ingot mold and a bottom therefor, said bottom having an opening to prevent the molten metal from splashing on the sides of the mold during the pouring operation.

7. The combination with an ingot mold, an ingot feeder of refractory material carried by the upper end of said mold, of a stool supporting the mold, and an ingot base of refractory material resting in a recess in the stool and closing the lower end of the mold and whereby the upper and lower ends of the ingot is prevented from cooling rapidly to produce an ingot more homogeneous throughout its length and free from piping in its upper end and cracks at its lower end.

8. The combination with an ingot mold, an ingot feeder of refractory material carried by the upper end of the mold, of a stool supporting the mold, and having a recess in its upper face and an ingot base tightly fitting in the recess in the stool and extending into the mold and closing the lower end thereof, whereby the upper and lower ends of the ingot are prevented from cooling rapidly to produce an ingot more homogeneous throughout its length and free from piping in its upper end and cracks at its lower end.

In testimony whereof, we hereunto affix our signatures.

BLOOMFIELD H. HOWARD.
ERNEST J. TURNER.

Witnesses:
RICHARD M. PARKER,
CHAS. P. WRIGHT.